US006889342B2

(12) United States Patent
Neudeck

(10) Patent No.: US 6,889,342 B2
(45) Date of Patent: May 3, 2005

(54) PREVENTING FLOPPY DISK DATA CORRUPTION

(75) Inventor: Alexander J Neudeck, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

(21) Appl. No.: 09/917,522

(22) Filed: Jul. 27, 2001

(65) Prior Publication Data

US 2003/0023907 A1 Jan. 30, 2003

(51) Int. Cl.[7] ................................................. G06F 11/00
(52) U.S. Cl. ...................................................... 714/42
(58) Field of Search ........................................... 714/42

(56) References Cited

U.S. PATENT DOCUMENTS

| 5,379,414 | A | * | 1/1995 | Adams | 714/55 |
| 5,423,029 | A | * | 6/1995 | Schieve | 714/42 |
| 5,790,869 | A | * | 8/1998 | Melo et al. | 710/240 |
| 5,983,002 | A | * | 11/1999 | Adams | 714/42 |
| 6,401,222 | B1 | * | 6/2002 | Adams | 714/42 |
| 2002/0046367 | A1 | * | 4/2002 | Yang | 714/44 |

OTHER PUBLICATIONS

Intel letter to customers dated May 2, 1988; 6 pages.
"IBM—NEC Meeting for uPD765A/uPD72065 Problem"; May 1987, NEC Electronics Inc.; Microcomputer Products Division, NEC Corporation; 9 pages.
"Hardware–Induced Data Virus (Floppy Diskett Controller Desgin Flaw) TR–881101–1"; Nov. 14, 1998; P.M. Adams, D.Sc., Ph.D.; Nova University, Dept of Computer Science, 3301 College Avenue, Ft. Lauderdale, FL 33314; 31 pages.

* cited by examiner

Primary Examiner—Robert Beausoliel
Assistant Examiner—Michael Maskulinski
(74) Attorney, Agent, or Firm—Alexander J. Neudeck

(57) ABSTRACT

DMA requests from at least one DMA channel with a higher priority than the floppy-disk controller are disabled for at least a portion of a write to floppy DMA operation that includes the transfer of the last byte. This helps ensure that DMA requests generated by the floppy-disk controller will be responded to in under 14 μS preventing an undetected underrun condition on systems with flawed floppy disk controllers from occurring. An estimate of when the last byte of a write to floppy DMA operation is going to be transferred is made. This estimate may be based upon a fixed interval from the start of the write operation. This estimate may also be based upon readings taken from the byte counter and of the DMA controller and the system timer.

44 Claims, 5 Drawing Sheets

PREVENTING FLOPPY DISK DATA CORRUPTION

FIELD OF THE INVENTION

This invention relates to the prevention of data corruption on computers containing flawed Floppy Diskette Controller chips.

BACKGROUND OF THE INVENTION

The Intel 8272A floppy-disk controller (FDC) and it's compatibles (for example, the NEC 765A) are not capable of detecting a direct memory access (DMA) underrun condition on the last byte of a write operation. This problem occurs in systems that: 1) use DMA to transfer data; and, 2) allow the floppy disk controller to be preempted by a DMA channel with higher priority. When this preemption causes the system to fail to respond to a floppy DMA request for more that 14 $\mu$S, possibly erroneous data is written to the floppy. This problem is compounded by the fact that by not responding in under 14 $\mu$S, the system does not detect that the data written to the floppy may be erroneous. This problem is further detailed in U.S. Pat. No. 5,379,414 issued to Adams and titled "SYSTEMS AND METHODS FOR FDC ERROR DETECTION AND PREVENTION" and is hereby incorporated herein by reference for all that it discloses.

Since the writing of erroneous data may cause files on the floppy to be lost or seriously corrupted, there is a need in the art for solutions that either detect, or prevent the writing of erroneous data to a floppy disk.

SUMMARY OF THE INVENTION

DMA requests generated by the floppy-disk controller are responded to in less than 14 $\mu$S. DMA requests from at least one DMA channel with a higher priority than the floppy-disk controller are disabled for at least a portion of a write to floppy DMA operation that includes the transfer of the last byte. This helps ensure that DMA requests generated by the floppy-disk controller will be responded to in under 14 $\mu$S preventing an undetected underrun condition on systems with flawed floppy disk controllers from occurring.

DETAILED DESCRIPTION OF THE PREFERRED EMBODIMENTS

In one embodiment, the requests from DMA channels with a higher priority are disabled for the entire write to floppy DMA operation. In another embodiment, an estimate of when the last byte of a write to floppy DMA operation is going to be transferred is made. This estimate is used to disable the interrupts from DMA channels with a higher priority than the floppy-disk controller for a window of time around the transfer of the last byte of a write. This estimate may be based upon a fixed interval from the start of the write operation. This estimate may also be based upon readings taken from the byte counter of the DMA controller and the system timer. A threshold byte count or an interpolated time value based upon the rate the byte count is changing may be used to as an estimate based upon readings taken from the byte counter.

Figure 1:
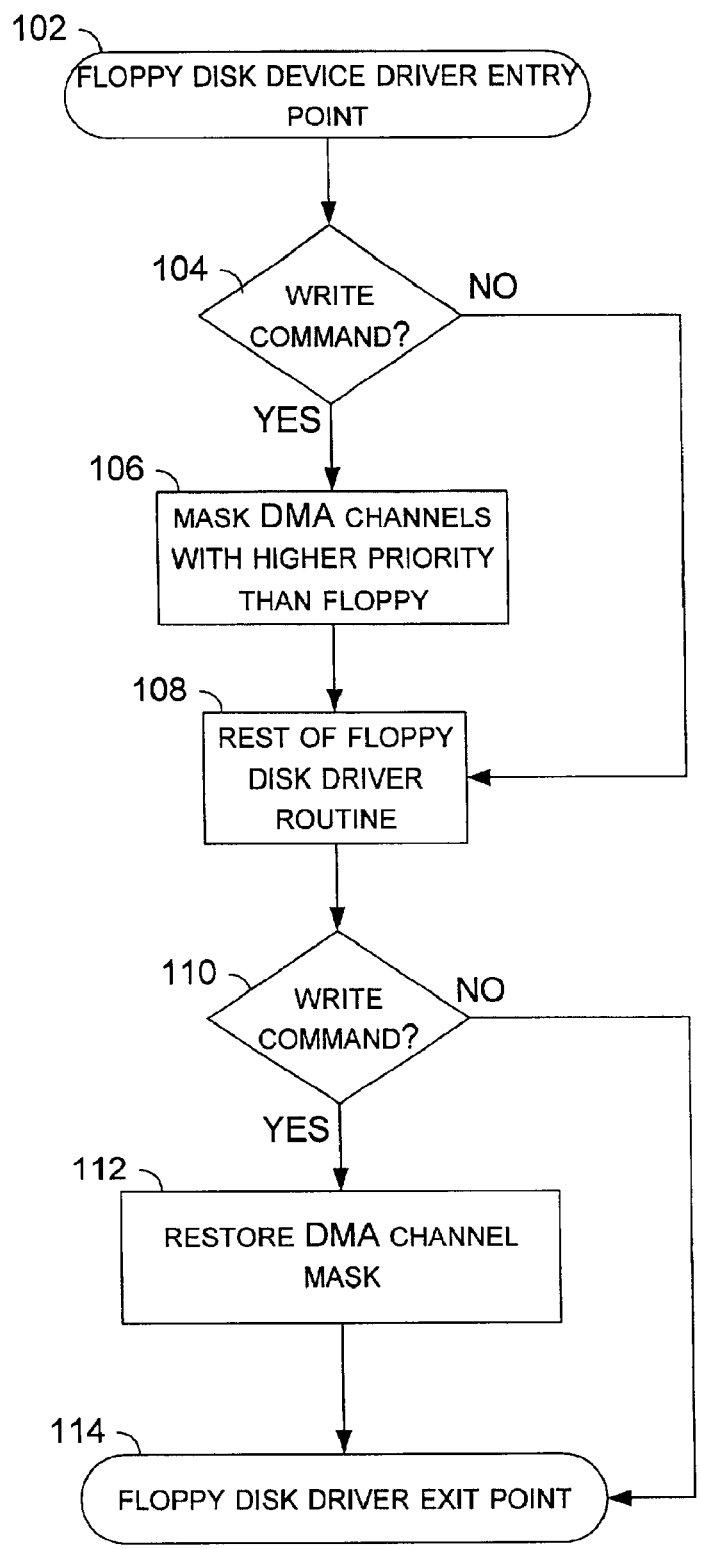
FIG. 1 is a flowchart illustrating steps that mask requests from DMA channels with a higher priority than the floppy disk during an entire floppy disk write operation.

FIG. 1 is a flowchart illustrating steps that mask requests from DMA channels with a higher priority than the floppy disk during an entire floppy disk write operation. In FIG. 1, the process starts at the entry point to the floppy disk driver, 102. After step 102, in a step 104, if the command given to the floppy disk driver is a write command, flow proceeds to step 106. If the command given to the floppy disk driver is not a write command, flow proceeds to step 108. In a step 106, the DMA channels that have higher priority than the floppy disk DMA channel are masked. This prevents those channels from preempting the DMA transfers from memory to the FDC. Since the FDC will now have the highest unmasked DMA priority, other DMA channels cannot preempt the FDC DMA requests thereby preventing the FDC DMA requests from being responded to in less than 14 $\mu$S. Masking of the DMA channels with higher priority than the floppy disk is done by writing certain mask bits into a control register of a DMA controller chip. Flow then proceeds to step 108.

In a step 108, the rest of the floppy disk driver routine executes. This step includes all of the processes and steps normally executed by the floppy disk driver routine to control, read, write, etc. the floppy disk, the FDC, and the DMA controller chip. After the rest of the floppy disk driver routine completes, flow proceeds to step 110.

In a step 110, if the command given to the floppy disk driver was a write command, flow proceeds to step 112. If the command given to the floppy disk driver was not a write command, flow proceeds to step 114. In a step 112, the DMA channel masks are restored to what they were before step 106. Normally, all the channels would be unmasked before step 106 and after step 112. If for some reason, one or more of the DMA channels that were masked in step 106 had its requests being masked before step 106, this mask would be restored. DMA channels with lower priority than the floppy disk may or may not be left unaltered by step 106 therefore they may or may not be restored by step 112 to a masked or unmasked status. After step 112 flow proceeds to step 114. Step 114 represents the exit point of the floppy disk driver routine.

Figure 2:
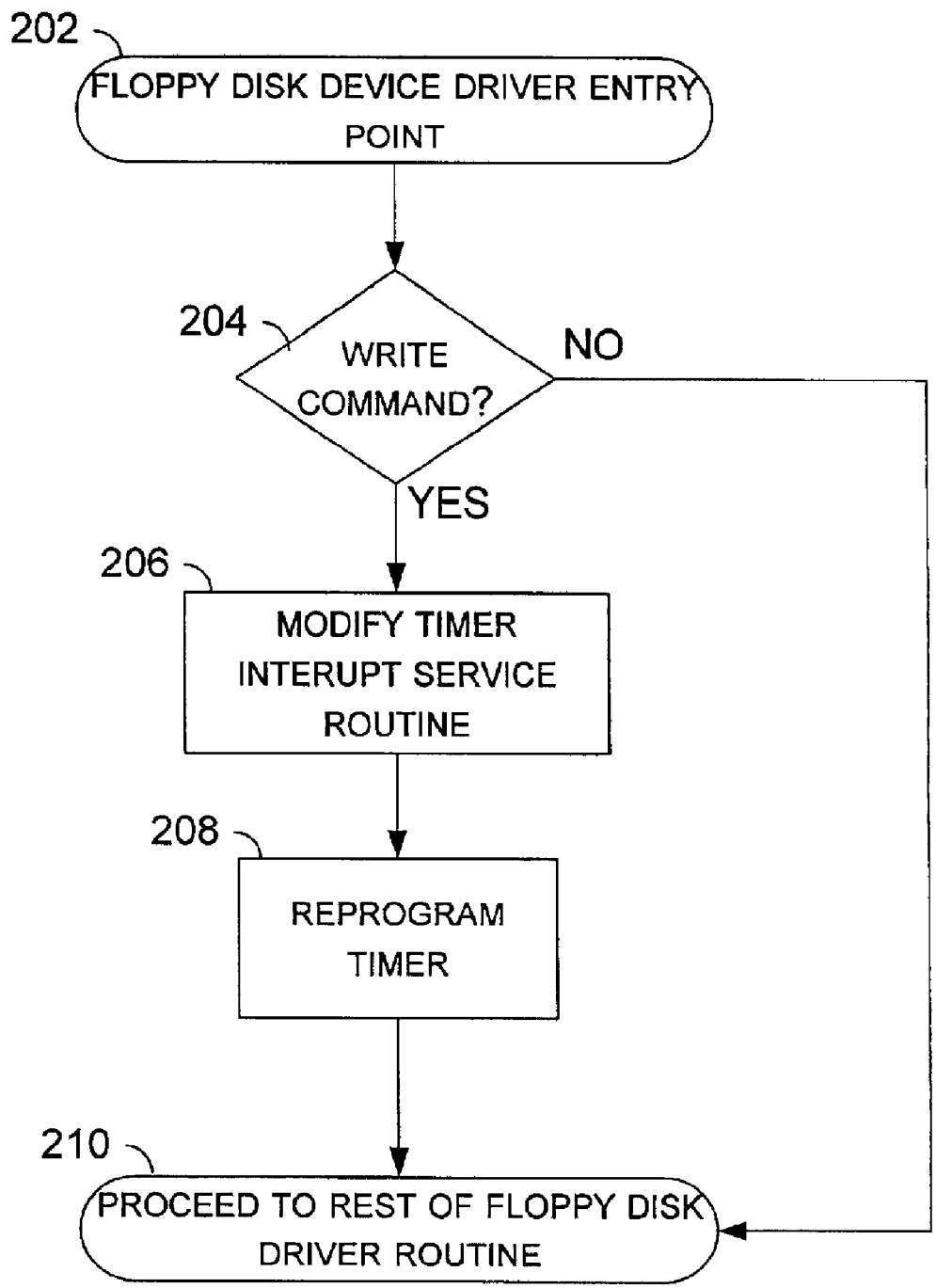
FIG. 2 is a flowchart illustrating steps that help allow the timer interrupt service routine monitor a floppy disk write operation.

FIG. 2 is a flowchart illustrating steps that help allow the timer interrupt service routine monitor a floppy disk write operation. In FIG. 2, the process starts at the entry point to the floppy disk driver, 202. After step 202, in a step 204, if the command given to the floppy disk driver is a write command, flow proceeds to step 206. If the command given to the floppy disk driver is not a write command, flow proceeds to step 210. In a step 206, the timer interrupt service routine is modified. After step 206, in a step 208, the timer is reprogrammed to interrupt the processor at a rapid rate. The modification of step 206 and reprogramming of step 208 allows monitoring of DMA process during the timer interrupt service routine so that the DMA channels with higher priority may be masked at an appropriately chosen time. Flow then proceeds to the rest of the floppy disk driver routine as represented by step 210.

Figure 3:
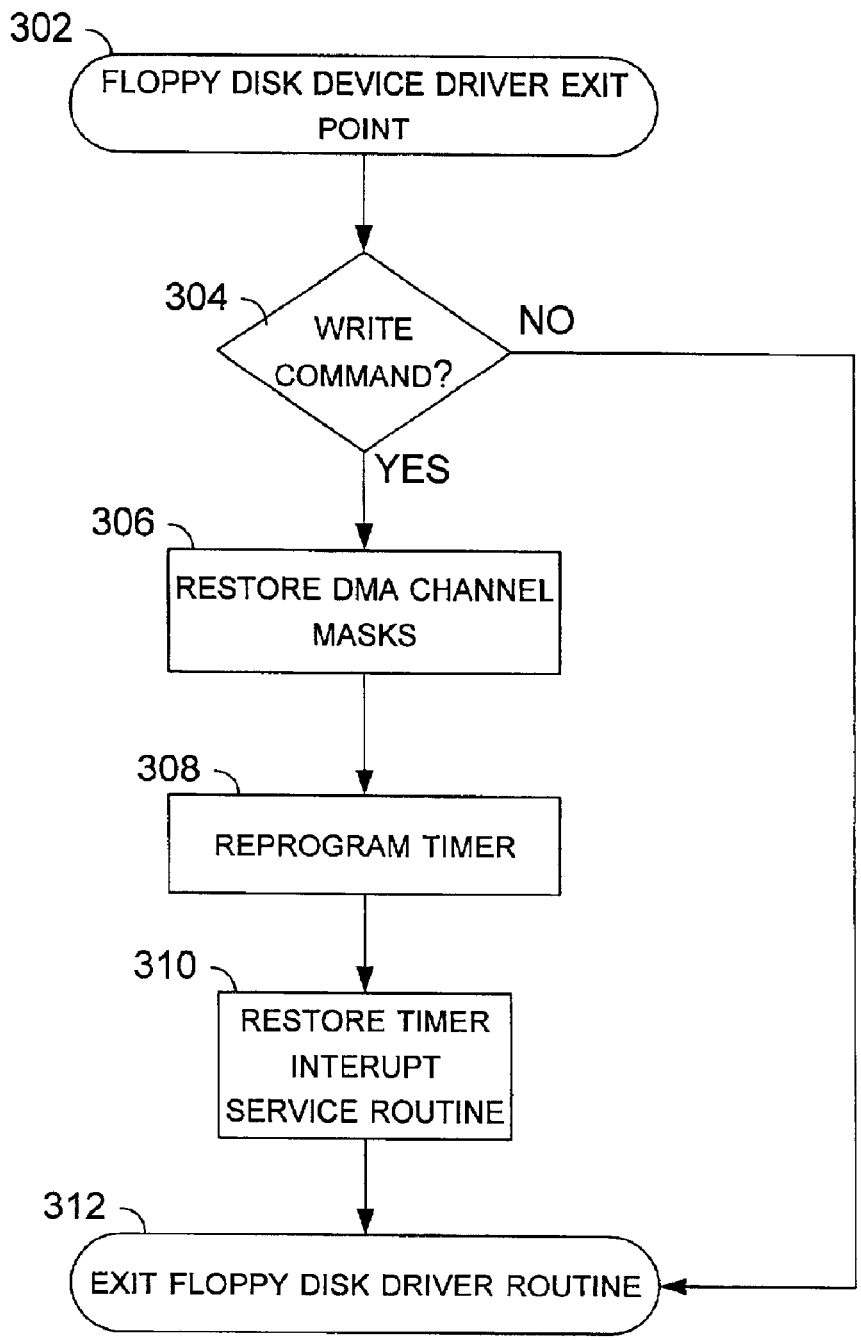
FIG. 3 is a flowchart illustrating steps that end the timer interrupt service routine's monitoring of a floppy disk writer operation.

FIG. 3 is a flowchart illustrating steps that end the timer interrupt service routine's monitoring of a floppy disk writer operation. In FIG. 3, the process starts at the exit point to the floppy disk driver, 302. After step 302, in a step 304, if the command given to the floppy disk driver is a write command, flow proceeds to step 306. If the command given to the floppy disk driver is not a write command, flow proceeds to step 310. In a step 306, the timer is reprogrammed to interrupt the processor at a normal rate. After step 306, in a step 308, the timer interrupt service routine may be restored to its original set of steps that it used before being modified by step 206 shown in FIG. 2. Flow then proceeds to exit the floppy disk driver routine as represented by step 310.

Figure 4:
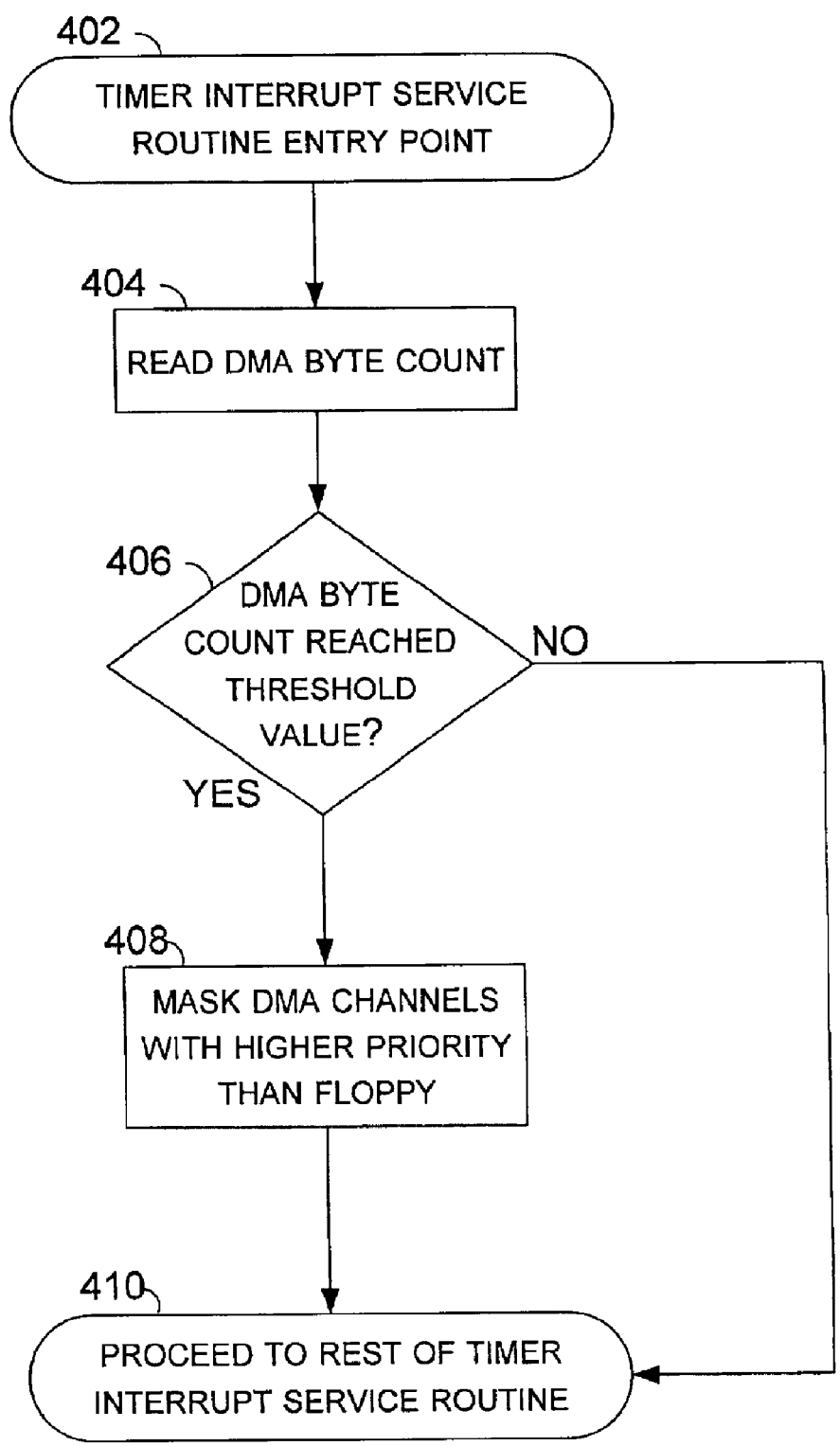
FIG. 4 is a flowchart illustrating steps that mask requests from DMA channels with a higher priority than the floppy disk during a portion of the floppy disk write operation.

FIG. 4 is a flowchart illustrating steps that mask requests from DMA channels with a higher priority than the floppy disk during a portion of the floppy disk write operation. In FIG. 4, the process starts at the entry point to the timer interrupt service routine, 402. After entry into the timer interrupt service routine 402 the DMA byte count is read in a step 404. Typically this would be done by reading a register in the DMA controller. After step 404, in a step 406, if the DMA byte count has reached a threshold value flow proceeds to a step 408. If the DMA byte count has not reached a threshold value, flow proceeds to step 410. In a step 408, the DMA channels that have higher priority than the floppy disk DMA channel are masked. This prevents those channels from preempting the DMA transfers from memory to the FDC. Since the FDC will now have the highest unmasked DMA priority, other DMA channels cannot preempt the FDC DMA requests thereby preventing the FDC DMA requests from being responded to in less than 14 $\mu$S. Masking of the DMA channels with higher priority than the floppy disk is done by writing certain mask bits into a control register of a DMA controller chip. By waiting until a threshold byte count in the DMA process before masking DMA requests, this method has less impact on the system than the method illustrated in FIG. 1.

Flow then proceeds to step 410. In a step 410, the rest of the timer interrupt service routine executes. This step includes all of the processes and steps normally executed by the timer interrupt service routine.

Figure 5:
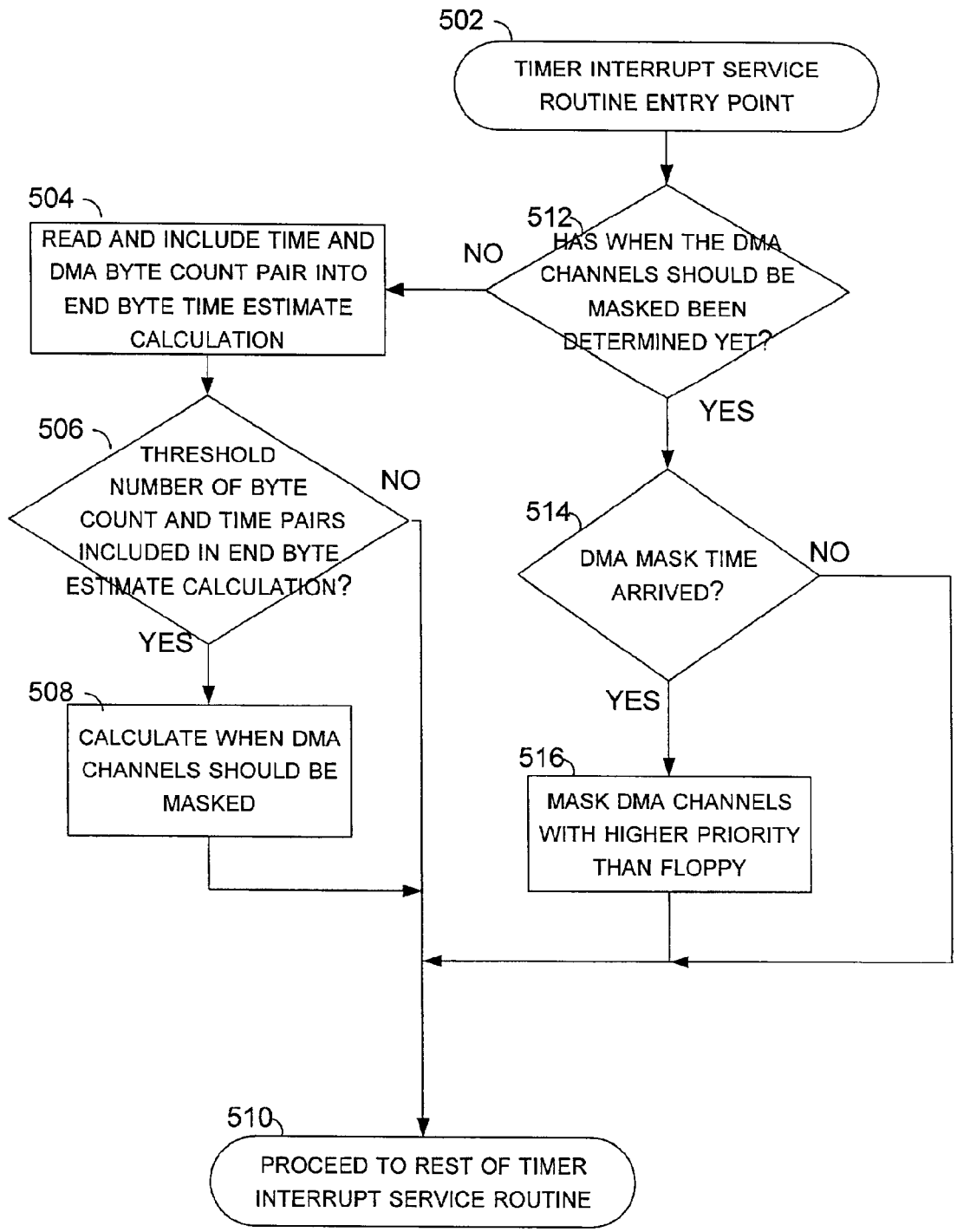
FIG. 5 is a flowchart illustrating steps that calculate an estimate of when to mask requests from DMA channels with a higher priority than the floppy disk and then mask those requests at the appropriate time.

FIG. 5 is a flowchart illustrating steps that calculate an estimate of when to mask requests from DMA channels with a higher priority than the floppy disk and then mask those requests at the appropriate time. In FIG. 5, the process starts at the entry point to the timer interrupt service routine, 502. After entry into the timer interrupt service routine 502, in a step 512, if it has been determined when the DMA channels should be masked flow proceeds to step 514. If it has not been determined when the DMA channels should be masked, flow proceeds to step 504. In a step 504 the DMA byte count and an indication of time are read and included in a calculation of an estimate of when the last byte of the DMA will be transferred. The indication of time may be in a variety of forms including clock ticks, seconds and milliseconds, or any other form that is obtainable. Typically the DMA byte count is obtained by reading a register in the DMA controller. The calculation of the estimate of when the last byte of the DMA will be transferred may be done in a number of ways including: linear interpolation, least squares fit method, or other curve fitting methods.

After step 504, in a step 506, if a threshold number of DMA byte count/time pairs have been included in the calculation of the estimate of when the last byte of the DMA will be transferred, flow proceeds to step 508. If the threshold number has not been included, flow proceeds to step 510. A threshold number is used to ensure that a minimum number of byte count/time pairs are included to provide sufficient accuracy and provide for any minimum number of pairs required by the curve fitting method chosen.

In a step 508, a time is calculated after which the DMA channels should be masked. This time is based upon the estimate of when the last byte of the DMA channel will be transferred. One way to calculate when the DMA channels should be masked is to subtract a predetermined amount of time from the estimate of when last byte will be transferred. Other ways may also be used. After step 508, flow proceeds to step 510 which represents the rest of the timer interrupt service routine. This step includes all of the processes and steps normally executed by the timer interrupt service routine.

In a step 514, if the DMA mask time has arrived, flow proceeds to step 516. If the DMA mask time has not arrived, flow proceed to step 510. In step 516, the DMA channels that have higher priority than the floppy disk DMA channel are masked. This prevents those channels from preempting the DMA transfers from memory to the FDC. Since the FDC will now have the highest unmasked DMA priority, other DMA channels cannot preempt the FDC DMA requests thereby preventing the FDC DMA requests from being responded to in less than 14 $\mu$S. Masking of the DMA channels with higher priority than the floppy disk is done by writing certain mask bits into a control register of a DMA controller chip. By basing the time to mask DMA request upon an estimate of the time the last byte will be transferred, this method may have less impact on the system than other methods.

Although several specific embodiments of the invention have been described and illustrated, the invention is not to be limited to the specific forms or arrangements so described and illustrated. The invention is limited only by the claims.

What is claimed is:

1. A method, comprising:

detecting whether a floppy disk operation is a write; and, masking DMA requests from at least one DMA channel during said write thereby preventing data corruption, wherein said at least one DMA channel has a higher priority than a DMA channel associated with said floppy disk operation.

2. The method of claim 1, wherein said masking DMA requests is only during a portion of said write.

3. The method of claim 1, wherein said masking DMA requests is during all of said write.

4. The method of claim 1, wherein said detecting and said masking is accomplished by said floppy disk driver routine.

5. The method of claim 1, comprising:

providing a timer interrupt service routine that accomplishes said masking.

6. The method of claim 5, comprising:

reprogramming a timer to interrupt at a more rapid rate.

7. The method of claim 5, comprising:

reading a DMA byte count.

8. The method of claim 7, comprising:

accomplishing said masking after said DMA byte count reaches a threshold.

9. The method of claim 7, comprising:

estimating when said write will complete from said DMA byte count.

10. The method of claim 9, wherein said estimating includes a linear interpolation.

11. The method of claim 9, wherein said estimating includes a least squares fit method.

12. The method of claim 9, wherein said estimating includes a polynomial fit method.

13. The method of claim 9, comprising:

determining a time to accomplish said masking based upon a result of said step of estimating.

14. An apparatus, comprising:

a floppy disk controller receiving data via DMA accesses under the control of a DMA controller wherein said DMA controller ignores at least one DMA request line when an underrun error may occur, wherein said at least one DMA request line has a higher priority than a DMA request line associated with said floppy disk controller.

15. The apparatus of claim 14 wherein said DMA controller ignores said at least one DMA request line for a transfer of data comprising a whole sector.

16. The apparatus of claim 14 wherein said DMA controller ignores said at least one DMA request line for a transfer of data comprising less than a whole sector.

17. The apparatus of claim 14 wherein said DMA controller ignores said at least one DMA request line after a threshold number of bytes have been transferred.

18. The apparatus of claim 14 wherein said DMA controller ignores said at least one DMA request line after a first time period has elapsed.

19. The apparatus of claim 14 wherein said DMA controller ignores said at least one DMA request line a second time period before a transfer of a last byte.

20. The apparatus of claim 19 wherein said second time period is based upon an estimate of when said transfer of said last byte will occur.

21. The apparatus of claim 20 wherein said estimate is derived by monitoring a DMA byte count.

22. The apparatus of claim 20 wherein said estimate is derived by monitoring a system clock.

23. The apparatus of claim 20 wherein said estimate is based upon samples taken of a DNA byte count and a system clock.

24. The apparatus of claim 23 wherein said samples are interpolated linearly to produce said estimate.

25. The apparatus of claim 23 wherein said samples are input to a least squares fit process to produce said estimate.

26. The apparatus of claim 23 wherein said samples are input to a polynomial curve fitting process to produce said estimate.

27. An apparatus, comprising:

a DMA controller in communication with a floppy disk controller; and, means for masking at least one DMA request line when a DMA underrun may occur due to an improperly designed floppy disk controller, wherein said at least one DMA request line has a higher priority than a DMA request line associated with said floppy disk controller.

28. The apparatus of claim 27 wherein said at least one DMA request line is masked based upon an estimate generated by a means for estimating.

29. The apparatus of claim 28 wherein said means for estimating includes means for linear interpolation.

30. The apparatus of claim 28 wherein said means for or estimating includes means for performing a least squares fit analysis.

31. The apparatus of claim 28 wherein said means for estimating includes means for performing a polynomial fit analysis.

32. A program storage medium readable by a computer, tangibly embodying a program of instructions executable by a computer to perform method steps, said method steps comprising:

detecting whether a floppy disk operation is a write; and, masking DMA requests from at least one DMA channel during said write thereby preventing data corruption, wherein said at least one DMA channel has a higher priority than a DMA channel associated with said floppy disk operation.

33. The program storage medium of claim 32, wherein said masking DMA requests is only during a portion of said write.

34. The program storage medium of claim 32, wherein said masking DMA requests is during all of said write.

35. The program storage medium of claim 32, wherein said detecting and said masking is accomplished by said floppy disk driver routine.

36. The program storage medium of claim 32, comprising:

providing a timer interrupt service routine that accomplishes said masking.

37. The program storage medium of claim 36, comprising:

reprogramming a timer to interrupt at a more rapid rate.

38. The program storage medium of claim 36, comprising: reading a DMA byte count.

39. The program storage medium of claim 38, comprising:

accomplishing said masking after said DMA byte count reaches a threshold.

40. The program storage medium of claim 38, comprising:

estimating when said write will complete from said DMA byte count.

41. The program storage medium of claim 40, wherein said estimating includes a linear interpolation.

42. The program storage medium of claim 40, wherein said estimating includes a least squares fit method.

43. The program storage medium of claim 40, wherein said estimating includes a polynomial fit method.

44. The program storage medium of claim 40, comprising:

determining a time to accomplish said masking based upon a result of said step of estimating.

* * * * *